United States Patent
Yagi et al.

(10) Patent No.: US 12,163,639 B2
(45) Date of Patent: Dec. 10, 2024

(54) COVER BODY

(71) Applicant: KOITO MANUFACTURING CO., LTD., Tokyo (JP)

(72) Inventors: Takamasa Yagi, Shizuoka (JP); Akira Watanabe, Shizuoka (JP); Taro Fujisawa, Shizuoka (JP); Tomonori Iida, Shizuoka (JP); Noriyuki Nakajima, Shizuoka (JP); Daisuke Okitsu, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 153 days.

(21) Appl. No.: 17/831,823

(22) Filed: Jun. 3, 2022

(65) Prior Publication Data

US 2022/0390084 A1    Dec. 8, 2022

(30) Foreign Application Priority Data

Jun. 8, 2021    (JP) .................. 2021-096142

(51) Int. Cl.
| | | |
|---|---|---|
| *B32B 27/08* | (2006.01) | |
| *B32B 3/02* | (2006.01) | |
| *B32B 7/023* | (2019.01) | |
| *F21S 43/20* | (2018.01) | |
| *F21W 103/10* | (2018.01) | |
| *F21W 103/35* | (2018.01) | |
| *F21W 103/45* | (2018.01) | |

(52) U.S. Cl.
CPC ................ *F21S 43/26* (2018.01); *B32B 3/02* (2013.01); *B32B 7/023* (2019.01); *B32B 27/08* (2013.01); *F21W 2103/10* (2018.01); *F21W 2103/35* (2018.01); *F21W 2103/45* (2018.01)

(58) Field of Classification Search
CPC .......... G01N 2035/00326; G01N 2035/00752; G01N 2035/00801; G01N 2035/0406; G01N 35/00732; G01N 35/0095; G16H 10/40; G16H 40/40; B29C 2045/0027; B29C 45/1615; B32B 27/08; B32B 3/02; B32B 7/023; F21S 43/26; F21W 2103/10; F21W 2103/35; F21W 2103/45
See application file for complete search history.

(56) References Cited

FOREIGN PATENT DOCUMENTS

JP    2011-187299 A    9/2011

*Primary Examiner* — Lawrence D Ferguson
(74) *Attorney, Agent, or Firm* — Venjuris, P.C.

(57) ABSTRACT

A cover body includes: a multi-color molded body including a first resin portion having a gate mark on an outer surface thereof, and a second resin portion having a color different from a color of the first resin portion and adhering to the outer surface of the first resin portion to cover the gate mark. An outer surface of the second resin portion includes a stepped portion that overlaps with the gate mark.

11 Claims, 5 Drawing Sheets

COVER BODY

CROSS-REFERENCE TO RELATED APPLICATIONS

This application is based on and claims priority from Japanese Patent Application No. 2021-096142, filed on Jun. 8, 2021, with the Japan Patent Office, the disclosure of which is incorporated herein in its entirety by reference.

TECHNICAL FIELD

The present disclosure relates to a cover body.

BACKGROUND

A cover body that protects a target object by covering at least a part of the target object may be formed by a multi-color molded body. For example, an outer cover of a vehicle lamp as a cover body may constitute a part of the appearance of a vehicle, and in this case, the design aspect tends to be emphasized. Japanese Patent Laid-Open Publication No. 2011-187299 discloses an outer cover of a vehicle lamp that is constituted by a multi-color molded body and constitutes a part of the appearance of a vehicle.

The outer cover of the vehicle lamp disclosed in Japanese Patent Laid-Open Publication No. 2011-187299 is a two-color molded body constituted by a first resin portion, which is a first molded body, and a second resin portion, which is a second molded body, and the second resin portion covers the entire outer surface of the first resin portion. As a result, according to Japanese Patent Laid-Open Publication No. 2011-187299, the outer cover of the vehicle lamp may cover a gate mark formed on the outer surface of the first resin portion with the second resin portion to make the gate mark invisible, and thus, it is considered to improve the design.

SUMMARY

However, when the gate mark is covered with a different resin portion as in the outer cover of the vehicle lamp according to Japanese Patent Laid-Open Publication No. 2011-187299, in the portion of the different resin portion that covers the gate mark and its surroundings, a sink may be created on a surface opposite to the resin portion side on which the gate mark is formed. In the outer cover of the vehicle lamp according to Japanese Patent Laid-Open Publication No. 2011-187299, the second resin portion that covers the gate mark of the first resin portion is positioned on the outer side from the first resin portion, and thus, the surface of the second resin portion on which the sink is created in this manner is exposed to the outside. As a result, it is concerned that the design is deteriorated due to the sink.

Therefore, the present disclosure is to provide a cover body capable of suppressing deterioration of design.

In order to achieve the above, a cover body according to the present disclosure includes a multi-color molded body including a first resin portion having a gate mark on an outer surface thereof, and a second resin portion having a color different from a color of the first resin portion and adhering to the outer surface of the first resin portion to cover the gate mark. An outer surface of the second resin portion includes a stepped portion that overlaps with the gate mark.

In this cover body, even when a sink is created in the outer surface in the portion of the second resin portion that covers the gate mark of the first resin portion and its surroundings, it is possible to overlap the sink and the stepped portion with each other. As a result, according to the cover body, the sink may become inconspicuous by the stepped portion, and thus, the deterioration of the design may be suppressed. The colors in the present disclosure also include colorless and transparent colors.

The gate mark may be a concave depression.

In this case, a height of the stepped portion may be smaller than a depth of the gate mark.

Further, the stepped portion may cross the gate mark.

With this configuration, the stepped portion appearing on the outer surface of the second resin portion may cross the sink. As a result, the sink may become more inconspicuous comparing with a case where the stepped portion is positioned only in a region where the sink is formed.

Further, the stepped portion may overlap with a center of the gate mark.

A center of the sink tends to be positioned immediately above the center of the gate mark. As a result, with this configuration, the stepped portion may overlap with the center of the sink, and thus, the sink may become more inconspicuous comparing with a case where the stepped portion does not overlap with the center of the gate mark.

Further, in the cover body, a character may be positioned on a side of the second resin portion away from the first resin portion to be visible from the outside, and overlaps with the gate mark.

With this configuration, the character and the sink may be overlapped with each other, and thus, the sink may become inconspicuous by the character. The character refers to, for example, a figure, a symbol, or a letter.

In this case, at least a part of the character may be drawn by the stepped portion.

The stepped portion is formed by an inclined surface that is inclined with respect to the outer surface of the first resin portion and crosses the gate mark, and the inclined surface overlaps with the center of the gate mark.

In this case, an edge of the inclined surface on one side in an inclination direction may overlap with the center of the gate mark.

The outer surface of the second resin portion is bent at the edge of the inclined surface described above. As a result, with this configuration, the bent portion of the outer surface of the second resin portion may overlap with the center of the sink, and thus, the sink may become more inconspicuous comparing with a case where the bent portion does not overlap with the center of the sink.

In this case, the edge on one side may be closer to the first resin portion than an edge of the inclined surface on the other side in the inclination direction.

With this configuration, the thickness of the second resin portion on the center of the gate mark may be thin as compared with a case where the edge on one side described above is farther from the first resin portion than the edge on the other side. As a result, since the sink may become smaller than the case described above, the sink may become more inconspicuous.

As described above, according to the present disclosure, the cover body capable of suppressing the deterioration of the design.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, embodiments of a cover body related to the present disclosure will be illustrated together with the accompanying drawings. The embodiments illustrated below are for facilitating the understanding of the present disclosure, and are not intended to limit the interpretation of the present disclosure. The present disclosure may be changed or improved from the embodiments without departing from the spirit of the present disclosure. Further, in the accompanying drawings, dimensions of each member may be exaggerated for ease of understanding.

Figure 1:
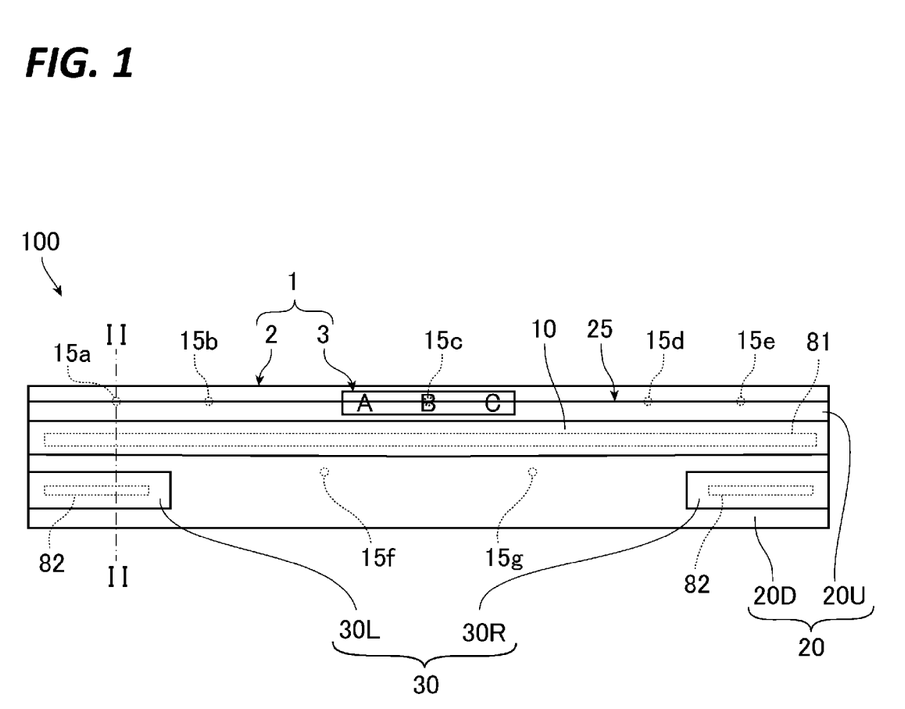
FIG. 1 is a front view schematically illustrating a vehicle lamp including a cover body according to an embodiment of the present disclosure.
Figure 2:
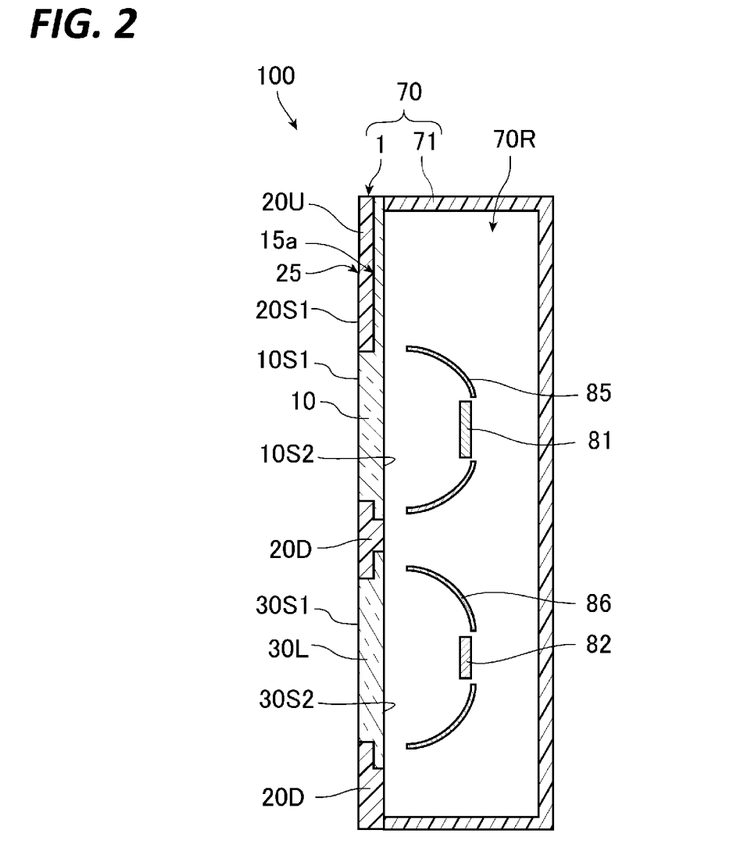
FIG. 2 is a view schematically illustrating a cross section of the vehicle lamp taken along line II-II in FIG. 1.

FIG. 1 is a front view schematically illustrating a vehicle lamp including a cover body according to an embodiment of the present disclosure. FIG. 2 is a view schematically illustrating a cross section of the vehicle lamp taken along line II-II in FIG. 1. A vehicle lamp 100 of the present disclosure is an indicator lamp for an automobile, and specifically, is a rear combination lamp in which a tail lamp, a stop lamp, and a back lamp are integrated.

As illustrated in FIGS. 1 and 2, the vehicle lamp 100 of the present disclosure is substantially symmetrically configured, and mainly include a case 70, a first light source 81, two second light sources 82, a first reflector 85, and two second reflectors 86. The case 70 mainly includes an outer cover 1 serving as a cover body and a lamp housing 71. The lamp housing 71 is configured as a box shape having one opening, and the outer cover 1 is fixed to the lamp housing 71 so as to close the opening. A space formed by the lamp housing 71 and the outer cover 1 is a lamp chamber 70R, and the first light source 81, the two second light sources 82, the first reflector 85, and the two second reflectors 86 are accommodated in the lamp chamber 70R.

The outer cover 1 serving as the cover body according to the embodiment includes a multi-color molded body 2 and a seal 3 attached to the multi-color molded body 2. In the embodiment, the shape of the multi-color molded body 2 is a plate-like shape extending vertically and horizontally and elongated in the left-right direction. The thickness of the multi-color molded body 2 is substantially uniform. The multi-color molded body 2 includes a first resin portion 10, a second resin portion 20, and a third resin portion 30, which have different colors. The first resin portion 10 and the third resin portion 30 are first molded bodies, and the second resin portion 20 is a second molded body. The first resin portion 10 and the third resin portion 30 have light transmittance, and the color of the first resin portion 10 is red, the second resin portion 20 is colorless and transparent. The color of the second resin portion 20 is black, and the light transmittance of the second resin portion 20 is lower than that of the first resin portion 10. An example of the material of the first resin portion 10, the second resin portion 20, and the third resin portion 30 may include acrylic resin.

Figure 3:
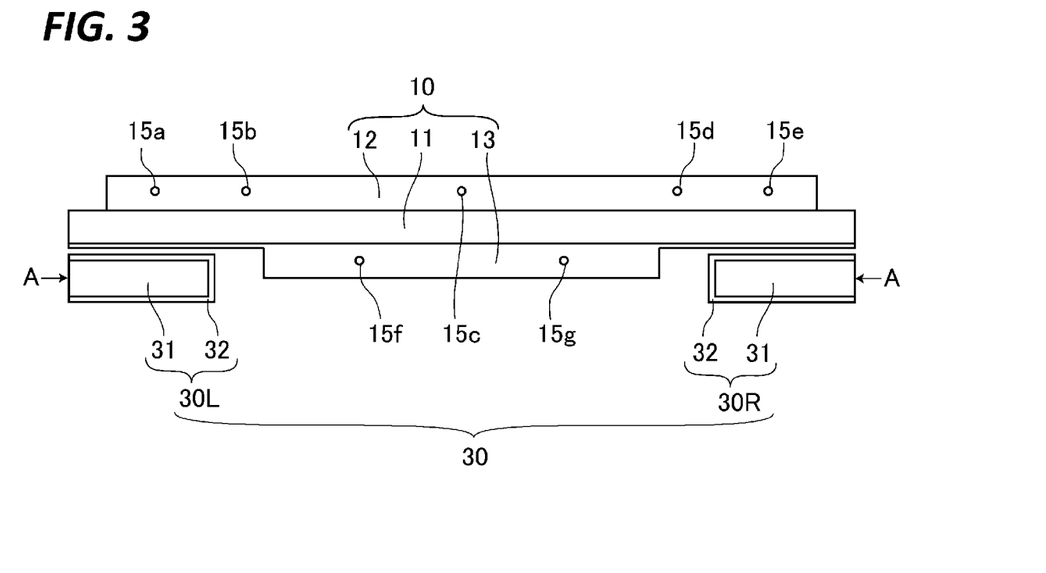
FIG. 3 is a front view schematically illustrating a first resin portion and a third resin portion, which are first molded bodies.

FIG. 3 is a front view schematically illustrating the first resin portion 10 and the third resin portion 30, which are first molded bodies, and is a front view of the first resin portion 10 and the third resin portion 30 viewed from the outside. As illustrated in FIGS. 2 and 3, the first resin portion 10 according to the embodiment is constituted by a main portion 11 having a plate-like shape extending vertically and horizontally and elongated in the left-right direction, an upper flange portion 12 connected to an upper edge portion of the main portion 11, and a lower flange portion 13 connected to a lower edge portion of the main portion 11. An inner surface of the upper flange portion 12 and an inner surface of the lower flange portion 13 are connected to an inner surface of the main portion 11, and these surfaces form an inner surface 10S2 which is a back surface of the first resin portion 10. The thickness of the upper flange portion 12 and the lower flange portion 13 is thinner than that of the main portion 11, and on an outer surface 10S1 that is a surface of the first resin portion 10, a stepped portion is formed between the main portion 11 and the upper flange portion 12, and between the main portion 11 and the lower flange portion 13. The thickness of the upper flange portion 12 and the lower flange portion 13 is, for example, approximately 1.8 mm to 2.6 mm, and the thickness of the main portion is, for example, approximately 2.6 mm to 3.2 mm Five gate marks 15a to 15e are formed on an outer surface of the upper flange portion 12 which is a part of the outer surface 10S1 of the first resin portion 10, and these gate marks 15a to 15e are lined up at intervals in the left-right direction. Further, on an outer surface of the lower flange portion 13 which is a different part of the outer surface 10S1, two gate marks 15f and 15g are formed at an interval in the left-right direction. These seven gate marks 15a to 15g are concave depressions having substantially the same shape. The shape of the outer edge is substantially circular, and the surface is substantially the same as a part of a spherical surface. The depth of the gate mark is, for example, approximately 0.7 mm to 0.8 mm. The shape of the gate marks 15a to 15g is not particularly limited, and, for example, may be a conical recessed shape.

The third resin portion 30 according to the embodiment is constituted by a right resin portion 30R and a left resin portion 30L. The right resin portion 30R and the left resin portion 30L are disposed at positions substantially symmetrical with each other in the left-right direction, and the shape of the right resin portion 30R and the left resin portion 30L are substantially symmetrical with each other in the left-right direction. As a result, the left resin portion 30L will be described, and descriptions on the right resin portion 30R will be omitted. The left resin portion 30L is disposed below the first resin portion 10, and also on the left side from the center of the first resin portion 10 in the left-right direction. The left resin portion 30L is constituted by a main portion 31 having a plate-like shape extending vertically and horizontally and elongated in the left-right direction, and a flange portion 32 connected to an edge portion of the main portion 31. The flange portion 32 extends continuously over an upper edge portion, a right edge portion, and a lower edge portion of the main portion 31. An inner surface of the flange portion 32 is connected to an inner surface of the main portion 31, and these surfaces form an inner surface 30S2 which is a back surface of the third resin portion 30. The thickness of the flange portion 32 is thinner than that of the main portion 31, and on an outer surface 30S1 that is a surface of the third resin portion 30, a stepped portion is formed between the main portion 31 and the flange portion 32. The thickness of the main portion 31 is, for example, the same as the thickness of the main portion 11 of the first resin portion 10, and the thickness of the flange portion 32 is, for example, the same as the thickness of the upper flange portion 12 of the first resin portion 10.

Figure 4:
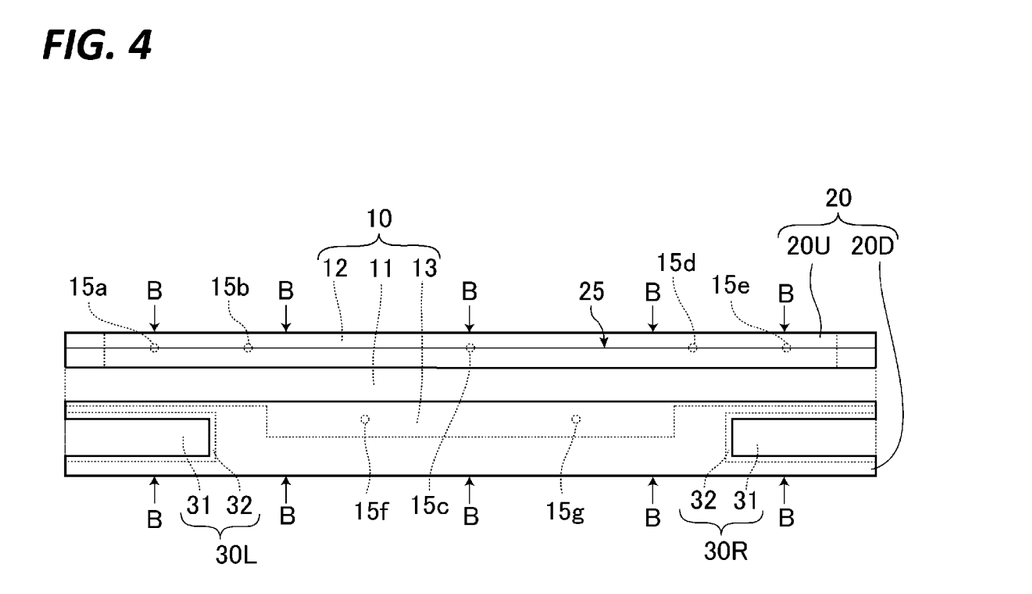
FIG. 4 is a front view schematically illustrating a second resin portion, which is a second molded body.

FIG. 4 is a front view schematically illustrating the second resin portion 20, which is a second molded body, and is a front view of the second resin portion 20 viewed from the outside. The first resin portion 10 and the third resin portion 30 are illustrated by a broken line in FIG. 4. As illustrated in FIGS. 2 and 4, the second resin portion 20 according to the embodiment is constituted by an upper resin portion 20U having a plate-like shape extending vertically and horizontally and elongated in the left-right direction, and a lower resin portion 20D disposed below the upper resin portion 20U and having a plate-like shape extending vertically and horizontally and elongated in the left-right direction. The upper resin portion 20U covers the entire upper flange portion 12 of the first resin 10 from the outside, and adheres to the outer surface of the upper flange portion 12. As a result, the five gate marks 15a to 15e on the outer surface of the upper flange portion 12 are covered with the upper resin portion 20U. A lower edge portion of the upper resin portion 20U is connected to the entire upper edge portion of the main portion 11 of the first resin portion 10, and an outer surface of the upper resin portion 20U is connected to the outer surface of the main portion 11. The lower resin portion 20D covers the entire lower flange portion 13, and the entire flange portion 32 from the outside, and adheres to the outer surfaces of the lower flange portion 13 and the flange portion 32. As a result, the two gate marks 15f and 15g on the outer surface of the lower flange portion 13 are covered with the lower resin portion 20D. Further, a gap between the first resin portion 10 and the third resin portion 30 in the vertical direction is embedded by the lower resin portion 20D, and the first resin portion 10 and the third resin portion 30 are connected via the lower resin portion 20D so that the first resin portion 10, the second resin portion 20, and the third resin portion 30 are integrated. Further, a part of an outer peripheral portion of the lower resin portion 20D is connected to the entire lower edge portion of the main portion 11, and an outer surface of the lower resin portion 20D is connected to the outer surface of the main portion 11. Further, a different part of the outer peripheral portion of the lower resin portion 20D is connected to the entire upper edge portion, right edge portion, and lower edge portion of the main portion 31 of the left resin portion 30L, and to the entire upper edge portion, left edge portion, and lower edge portion of the main portion 31 of the right resin portion 30R. Then, the outer surface of the lower resin portion 20D and the outer surface of the main portion 31 of each of the left resin portion 30L and the right resin portion 30R are connected with each other. The second resin portion 20 does not cover the main portion of the first resin portion 10 and the main portion 31 of each of the right resin portion 30R and the left resin portion 30L, and the second resin portion 20 and the main portions 11 and 31 are exposed to the outside.

Figure 5:
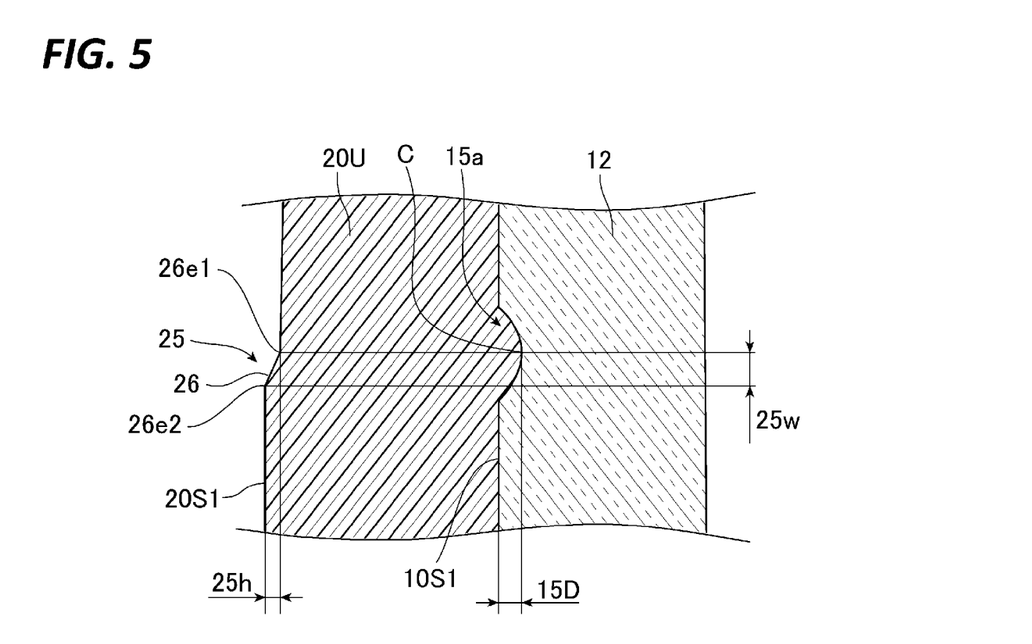
FIG. 5 is an enlarged cross-sectional view illustrating the vicinity of a gate mark in FIG. 2.

FIG. 5 is an enlarged cross-sectional view illustrating the vicinity of the gate mark 15a in FIG. 2. As illustrated in FIGS. 4 and 5, the outer surface of the upper resin portion 20U includes a stepped portion 25. In the embodiment, the stepped portion 25 extends linearly from the right edge to the left edge of the surface. Further, the stepped portion 25 is formed by an inclined surface 26. The inclined surface 26 is inclined upward with respect to the outer surface of the upper flange portion 12 which is a part of the outer surface 10S1 of the first resin portion 10 so as to be close to the upper flange portion 12. As a result, the thickness of the upper stepped portion 25 of the upper resin portion 20U is thinner than that of the lower stepped portion 25. As illustrated in FIG. 4, the stepped portion 25 overlaps with the five gate marks 15a to 15e when the outer surface of the upper resin portion 20U is viewed from the front. Further, when viewing in this manner, a width 25w of the stepped portion 25 in the inclination direction of the inclined surface 26 is smaller than a maximum width of each of the gate marks 15a to 15e with which the stepped portion overlaps, and is, for example, 0.5 mm or less. The stepped portion 25 crosses each of the gate marks 15a to 15e. Further, the stepped portion 25 overlaps with a center C of each of the gate marks 15a to 15e. More specifically, an edge 26e1 of the inclined surface 26 on one side in the inclination direction overlaps with the center C of the gate marks 15a to 15e. The edge 26e1 on one side is closer to the first resin portion 10 than an edge 26e2 of the inclined surface 26 on the other side in the inclination direction. Further, a height 25h of the stepped portion 25 is smaller than a depth 15D of the gate marks 15a to 15e, and is, for example, approximately 0.1 mm to 0.3 mm. The height 25h of the stepped portion 25 is a height in the direction perpendicular to the outer surface of the upper flange portion 12 in the vicinity of the stepped portion 25. Further, the height 25h of the stepped portion 25 may be the depth 15D or more of the gate marks 15a to 15e.

Next, a method for manufacturing the multi-color molded body 2 of the outer cover 1 according to the embodiment will be described.

Figure 6:
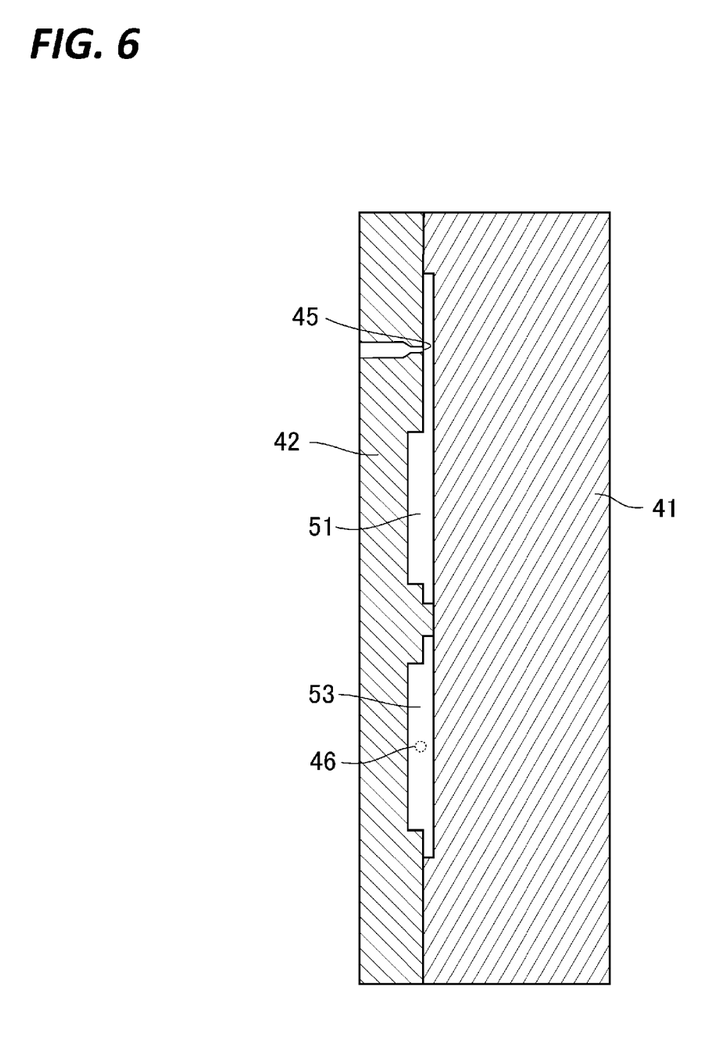
FIG. 6 is a cross-sectional view schematically illustrating an example of a state in which the first resin portion and the third resin portion, which are the first molded bodies, are molded.

FIG. 6 is a cross-sectional view schematically illustrating an example of a state in which the first resin portion 10 and the third resin portion 30, which are the first molded bodies, are molded, and illustrates a cross section passing through a gate that forms the gate mark 15a. As illustrated in FIG. 6, the first resin portion 10 and the third resin portion 30 are formed using a fixed first mold 41, and a second mold 42 movable with respect to the first mold 41. In a state where the second mold 42 is pressed against the first mold 41 so that the first mold 41 and the second mold 42 are joined with each other, a space 51 corresponding to the first resin 10 and a space 53 corresponding to the third resin portion 30 are formed between the first mold 41 and the second mold 42. In the second mold 42, seven direct gates 45 are formed at positions corresponding to the first resin portion 10. Further, in the second mold 42, side gates are formed at positions corresponding to each of the right resin portion 30R and the left resin portion 30L of the third resin portion 30. In FIG. 3, the positions corresponding to the side gates are indicated by arrows A, and in FIG. 6, a side gate 46 corresponding to the left resin portion 30L is illustrated by a broken line. As described above, in the state where the first mold 41 and the second mold 42 are joined with each other, a resin in a molten state to be the first resin portion 10 is injected from the direct gate 45 to the space 51 to fill the space 51. Then, the direct gate 45 is closed by a tip end portion of a gate pin (not illustrated) to hold the filled molten resin. Further, a resin in a molten state to be the third resin portion 30 is injected from the side gate 46 to the space 53 to fill the space 53, and the filled molten resin is held. As described above, by cooling and solidifying the molten resin that is filled into each of the spaces 51 and 53, the first resin portion 10 and the third resin portion 30, which are the first molded bodies, are molded. At this time, in the first resin portion 10, the gate marks 15a to 15g described above are formed due to the tip end portion of the gate pin that closes the direct gate 45, and the shape of the gate marks 15a to 15g is substantially corresponding to the shape of the tip end portion. The position of the gate from which the resin in a molten state to be the first resin portion 10 is injected to the space 51, and the position of the gate from which the resin in a molten state to be the third resin portion 30 is injected to the space 53 are not particularly limited. Next, the second mold 42 is exchanged to a third mold to form the second resin portion 20, which is the second molded body.

Figure 7:
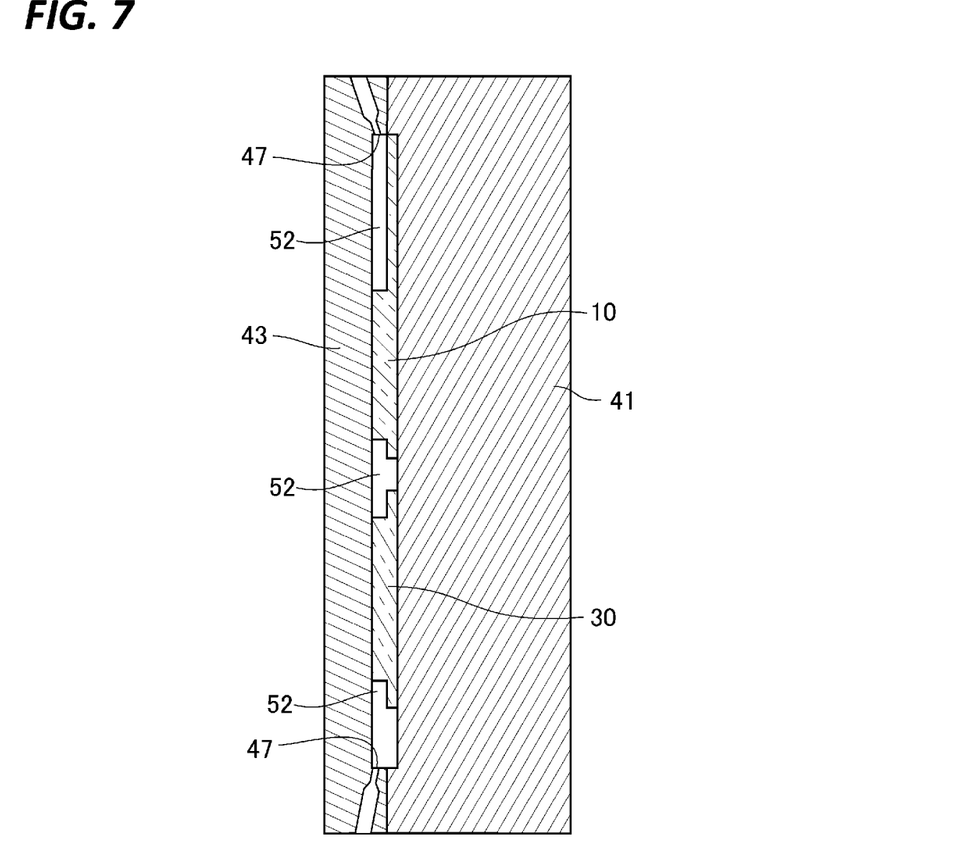
FIG. 7 is a cross-sectional view schematically illustrating an example of a state in which the second resin portion, which is the second molded body, is molded.

FIG. 7 is a cross-sectional view schematically illustrating an example of a state in which the second resin portion 20 is molded, and illustrates a cross section at the same position as FIG. 6. As illustrated in FIG. 7, in a state where a third mold 43 is pressed against the first mold 41 so that the first mold 41 and the third mold 43 are joined with each other, a space 52 corresponding to the second resin portion 20 is formed between the first mold 41 and the third mold 43. In the third mold 43, a plurality of side gates 47 is formed at positions corresponding to the second resin portion 20. In FIG. 4, the positions corresponding to the side gates 47 are indicated by arrows B. As described above, in the state where the first mold 41 and the third mold 43 are joined with each other, a resin in a molten state to be the second resin portion 20 is injected from the side gates 47 to the space 52 to fill the space 52, and the filled molten resin is held. By cooling and solidifying the molten resin that is filled into the space 52, the second resin portion 20, which is the first molded body, is molded, and the multi-color molded body 2 is produced. The position of the gate from which the resin in a molten state to be the second resin portion 20 is injected to the space 52 is not particularly limited.

Next, returning to FIG. 1, the seal 3 will be described. The seal 3 according to the embodiment is attached to the outer surface of the upper resin portion 20U, which is a part of the outer surface 20S1 of the second resin portion 20 of the multi-color molded body 2. A plurality of characters is drawn on the seal 3. By this seal 3, the characters positioned on the second resin portion 20 away from the first resin portion 10 and visible from the outside are drawn on the outer cover 1. The characters in the embodiment are white letters such as "A," "B," and "C," and "B" overlaps with the gate mark 15c. The characters may be a figure, a symbol, and a letter, and the number or the color of the characters is not particularly limited. As the seal 3, for example, a laminated body including a colorless and transparent base material layer, a printing layer formed on one surface of the base material layer, and a colorless and transparent adhesive layer formed on the other surface of the base material layer may be used, and the character is drawn by the print layer.

The first light source 81 illustrated in FIGS. 1 and 2 emits light as a tail lamp or light as a stop lamp. In the embodiment, the first light source 81 is a so-called light emitting diode (LED) array in which a plurality of LEDs is arranged in the left-right direction, and each LED emits white light. The first light source 81 is disposed to face the main portion 11 of the first resin portion 10, and the light emitted from the first light source 81 passes through the main portion 11 and is emitted to the outside. Since the color of the first resin portion 10 is red, the light of the red component among the light emitted from the first light source 81 is emitted to the outside. Further, the surroundings of the first light source 81 are surrounded by the first reflector 85 so that the light emitted from the first light source 81 is effectively incident to the main portion 11. Further, the light emitted from the first light source 81 is suppressed from being incident to the main portion 31 of the third resin portion 30 by the first reflector 85.

The two light sources 82 emit light as a back lamp. In the embodiment, the second light source 82 is a so-called LED array in which a plurality of LEDs is arranged in the left-right direction, and each LED emits white light. One second light source 82 is disposed to face the main portion 31 of the right resin portion 30R of the third resin portion 30, and the other second light source 82 is disposed to face the main portion 31 of the left resin portion 30L. Light emitted from each second light source 82 passes through the main portion 31 and is emitted to the outside. Since the third resin portion 30 is colorless, the white light emitted from the second light source 82 is emitted to the outside. Further, the surroundings of each second light source 82 are surrounded by the second reflector 86 so that the light emitted from the second light source 82 is effectively incident to the main portion 31. Further, the light emitted from the second light source 82 is suppressed from being incident to the main portion 11 of the first resin portion by the second reflector 86.

As described above, the outer cover 1 serving as a cover body in the embodiment includes the multi-color molded body 2. The multi-color molded body 2 includes the first resin portion 10 having the gate marks 15a to 15g on the outer surface 10S1, and the second resin portion 20 having a color different from the first resin portion 10 and adhering to the outer surface 10S1 of the first resin portion 10 to cover the gate marks 15a to 15g. The outer surface 20S1 of the second resin portion 20 includes the stepped portion 25 that overlaps with the gate marks 15a to 15g. As a result, even when the sink is created in the outer surface 20S1 in the portion of the second resin portion 20 that covers the gate marks 15a to 15e of the first resin portion 10 and its surroundings, the sink may overlap with the stepped portion 25. As a result, according to the outer cover 1 according to the embodiment, the sink may become inconspicuous by the stepped portion 25, and thus, the deterioration of the design may be suppressed.

Further, in the outer cover 1 according to the embodiment, the stepped portion 25 crosses the gate marks 15a to 15e. As a result, according to the outer cover 1 according to the embodiment, the stepped portion 25 appearing on the outer surface 20S1 of the second resin portion 20 may cross the sink. Therefore, the sink may become more inconspicuous comparing with a case where the stepped portion 25 is positioned in the region where the sink is formed.

Further, in the outer cover 1 according to the embodiment, the stepped portion 25 overlaps with the center C of each of the gate marks 15a to 15e. The center of the sink tends to be positioned immediately above the center of the gate mark. As a result, according to the outer cover 1 according to the embodiment, the stepped portion 25 may overlap with the center of the sink. Therefore, the sink may become more inconspicuous comparing with a case where the stepped portion 25 does not overlap with the center C of each of the gate marks 15*a* to 15*e*.

Further, on the outer cover 1 according to the embodiment, the letter "B," which is a character positioned on a side of the second resin portion 20 away from the first resin portion 10 to be visible from the outside, and overlaps with the gate mark 15*c*, is drawn. As a result, since the letter "B," which is the character, may overlap with the sink, the sink may become more inconspicuous by the letter "B," which is the character.

Further, in the outer cover 1 according to the embodiment, the stepped portion 25 is formed by the inclined surface 26 that is inclined with respect to the outer surface of the upper flange portion 12 that is a part of the outer surface 10S1 of the first resin portion 10 and crosses each of the gate marks 15*a* to 15*e*. Further, the edge 26*e*1 of the inclined surface 26 on one side in the inclination direction overlaps with the center C of the gate marks 15*a* to 15*e*. The outer surface 20S1 of the second resin portion 20 is bent at the edge of the inclined surface 26. According to the outer cover 1 according to the embodiment, the bent portion of the outer surface 20S1 of the second resin portion 20 may overlap with the center of the sink, and thus, the sink may become more inconspicuous comparing with a case where the bent portion does not overlap with the center of the sink. The inclined surface 26 may not overlap with the center C of the gate marks 15*a* to 15*e*. However, from the viewpoint of making the sink more inconspicuous, it is desirable that the inclined surface 26 overlaps with the center C of the gate marks 15*a* to 15*e*, and it is further desirable that the edge 26*e*1 of the inclined surface 26 on one side overlaps with the center C of the gate marks 15*a* to 15*e*. Further, in the outer cover 1 according to the embodiment, the inclination angle of the inclined surface 26 with respect to the outer surface of the upper flange portion 12 is an acute angle. As a result, according to the outer cover 1 according to the embodiment, burrs may be less likely to occur on both edges of the inclined surface 26 in the inclination direction comparing with a case where the inclination angle of the inclined surface 26 is substantially 90 degrees.

Further, in the outer cover 1 according to the embodiment, the edge 26*e*1 on one side is closer to the first resin portion 10 than the edge 26*e*2 of the inclined surface 26 on the other side in the inclination direction. As a result, the thickness of the second resin portion 20 on the center C of each of the gate marks 15*a* to 15*e* may become thin comparing with a case where the edge 26*e*1 on one side is farther from the first resin portion 10 than the edge 26*e*2 on the other side. As a result, according to the outer cover 1 according to the embodiment, the sink may become smaller than the case described above, and thus, the sink may become more inconspicuous. The edge 26*e*1 on one side may be farther from the first resin portion 10 than the edge 26*e*2 on the other side. Even in that case, the bent portion of the outer surface 20S1 of the second resin portion 20 may overlap with the center of the sink, and thus, the sink may become more inconspicuous comparing with a case where the bent portion does not overlap with the center of the sink.

In the above, the present disclosure has been described with reference to the embodiment as an example, but the present disclosure is not limited thereto.

For example, in the embodiment, the multi-color molded body 2 including the first resin portion 10, the second resin portion 20, and the third resin portion 30, which have different colors, has been described as an example. However, the multi-color molded body 2 may include the first resin portion 10 and the second resin portion 20, which have different colors, and for example, the multi-color molded body 2 may not include the third resin portion 30. Further, the color of the resin portion including the first resin portion 10 and the second resin portion 20 is not particularly limited. For example, in the embodiment, the third resin portion 30 may have an orange color having light transparency, and the two second light sources 82 may be configured to emit light as turn lamps. In this manner, the vehicle lamp 100 may be a rear combination lamp in which a tail lamp, a stop lamp, and a turn lamp are integrated. As described above, the vehicle lamp using the outer cover 1 is not particularly limited.

Further, in the embodiment, the outer cover 1 used in the vehicle lamp 100 has been described as an example of the cover body. However, the cover body is not particularly limited. For example, the cover body may be a part of a case accommodating a sensor such as a millimeter wave radar and a LIDAR. In this case, the multi-color molded body of the cover body may be constituted by a plurality of resin portions having a lower light transmittance so that the inside thereof may not be visible from the outside.

Further, in the embodiment, the first resin portion 10 having the seven gate marks 15*a* to 15*g* on the outer surface 10S1 has been described as an example. However, the number of the gate marks is not particularly limited, and for example, may be one.

Further, in the embodiment, the stepped portion 25 that linearly extends to cross the five gate marks 15*a* to 15*e* has been described as an example. However, the stepped portion 25 may overlap with the gate marks, and the number of gate marks with which the stepped portion 25 overlaps is not particularly limited. For example, the stepped portion 25 may extend in a curved shape to cross a plurality of gate marks. Further, the entire stepped portion 25 may overlap with a part of one gate mark. For example, such a stepped portion 25 may be formed by a groove. Further, the number of stepped portion 25 provided with the outer surface 20S1 of the second resin portion 20 is not particularly limited. For example, in the embodiment, the outer surface 20S1 may further include another stepped portion that linearly extends and overlaps with two gate marks 15*f* and 15*g*. Further, the outer surface 20S1 may have the same number of stepped portions 25 as the number of gate marks, and each stepped portion 25 may overlap with different gate marks, or a plurality of stepped portions may overlap with the same gate mark.

Further, in the embodiment, the stepped portion 25 is formed by the inclined surface 26 that is inclined with respect to the outer surface 10S1 of the first resin portion 10. However, the stepped portion 25 may be formed by a surface substantially perpendicular to the outer surface 10S1.

Figure 8:
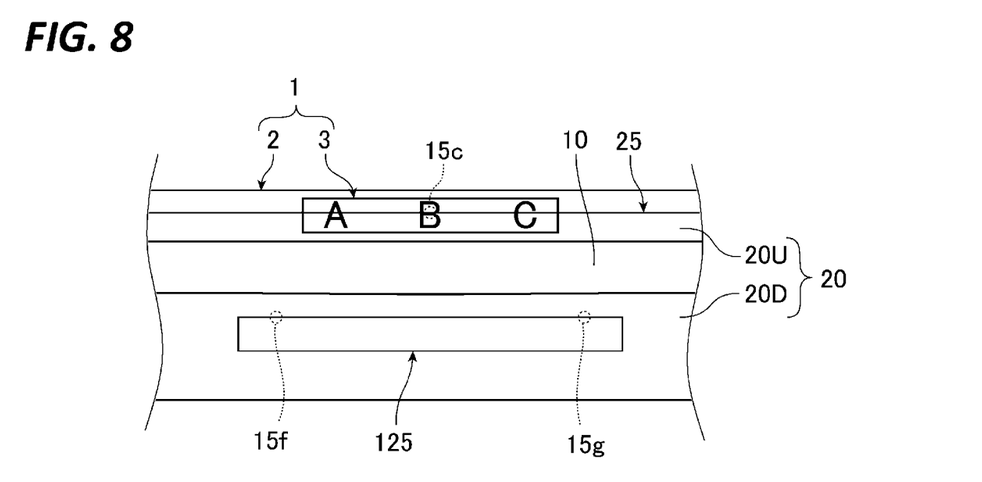
FIG. 8 is an enlarged front view illustrating a part of an outer cover related to a modification.

Further, in the embodiment, the outer cover 1 on which the characters visible from outside are drawn by the seal 3 attached to the multi-color molded body 2 has been described as an example. However, the character may be positioned on a side of the second resin portion 20 away from the first resin portion 10 to be visible from the outside, and for example, at least a part of the character may be drawn by the stepped portion 25. FIG. 8 is an enlarged front view illustrating a part of an outer cover related to a modification. The outer cover 1 according to the modification illustrated in FIG. 8 is different from the outer cover 1 according to the embodiment in that a stepped portion 125 different from the stepped portion 25 is further provided, and the stepped portion 125 is different from the stepped portion

25 in an arrangement. In the modification, the outer surface of the lower resin portion 20D that is a part of the outer surface 20S1 of the second resin portion 20 includes the stepped portion 125. The stepped portion 125 extends so as to draw a rectangle to cross the two gate marks 15*f* and 15*g*. The region in the outer surface of the lower resin portion 20D surrounded by the stepped portion 125 is closer to the first resin portion 10 side than the other regions. As described above, on the outer cover 1 according to the modification, the rectangle as a character is drawn by the stepped portion 125. The rectangle as the character is positioned on the second resin portion 20 side from the first resin portion 10 and overlaps with the two gate marks 15*f* and 15*g*. Even with the rectangle as a character, the sink on the outer surface 20S1 of the second resin portion 20 may become inconspicuous. A part of the character may be drawn by the stepped portion provided in the outer surface 20S1 of the second resin portion 20, and the other part of the character may be drawn by the seal attached to the outer surface 20S1. Further, when the second resin portion 20 has light transparency, for example, the seal on which the character is drawn may be disposed inside the second resin portion 20, and the character may be visible from the outside and may overlap with the gate mark.

According to the present disclosure, a cover body capable of suppressing deterioration of design is provided, and is applicable to a field of a case for a vehicle lamp of an automobile.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A cover body comprising:
    a multi-color molded body including a first resin having a gate mark on an outer surface thereof, and a second resin having a color different from a color of the first resin and adhering to the outer surface of the first resin to cover the gate mark,
    wherein an outer surface of the second resin includes a step that overlaps with the gate mark when viewed from a front of the outer surface of the second resin,
    the gate mark is a concave depression, and
    a height of the step is smaller than a depth of the gate mark.

2. The cover body according to claim 1, wherein the step crosses the gate mark.

3. The cover body according to claim 1, wherein the step overlaps with a center of the gate mark.

4. A cover body comprising:
    a multi-color molded body including a first resin having a gate mark on an outer surface thereof, and a second resin having a color different from a color of the first resin and adhering to the outer surface of the first resin to cover the gate mark,
    wherein an outer surface of the second resin includes a step that overlaps with the gate mark when viewed from a front of the outer surface of the second resin, and
    a character is positioned on a side of the second resin away from the first resin to be visible from an outside, and overlaps with the gate mark.

5. The cover body according to claim 4, wherein at least a part of the character is drawn by the step.

6. The cover body according to claim 1, wherein the step is formed by an inclined surface that is inclined with respect to the outer surface of the first resin, and crosses the gate mark, and
    the inclined surface overlaps with a center of the gate mark.

7. The cover body according to claim 6, wherein one edge of the inclined surface in an inclination direction overlaps with the center of the gate mark.

8. The cover body according to claim 7, wherein the one edge is closer to the first resin than a remaining edge of the inclined surface in the inclination direction.

9. The cover body according to claim 6, wherein the inclined surface is inclined upward with respect to an outer surface of an upper flange portion which is a portion of the outer surface of the first resin so as to be close to the upper flange portion.

10. The cover body according to claim 6, wherein the outer surface of the second resin is bent at an edge of the inclined surface.

11. The cover body according to claim 1, wherein a width of the step is smaller than a maximum width of the gate mark.

* * * * *